United States Patent [19]

Daolio et al.

[11] 4,297,188
[45] Oct. 27, 1981

[54] PROCESS FOR THE ELECTROLYTIC COATING OF CONDUCTIVE SUBSTRATES WITH PROTECTIVE FILMS OF PHENOLIC RESINS

[75] Inventors: Sergio Daolio, Luzzara; Guiliano Mengoli, Padua; Carlo Folonari, Turin; Marco Musiani, Casalecchio di Reno, all of Italy

[73] Assignees: Centro Ricerche Fiat S.p.A., Orbassano; Consiglio Nazionale Delle Richerche, Rome, both of Italy

[21] Appl. No.: 189,989

[22] Filed: Sep. 23, 1980

[30] Foreign Application Priority Data

Sep. 24, 1979 [IT] Italy ............................... 68853 A/79

[51] Int. Cl.³ ........................................... C25D 13/08
[52] U.S. Cl. ................................................ 204/181 R
[58] Field of Search .................................... 204/181 R

[56] References Cited

U.S. PATENT DOCUMENTS 3,335,075  8/1967  Bonman .......................... 204/181 R
3,655,543  4/1972  Dijkstra et al. ................. 204/681 R

*Primary Examiner*—Howard S. Williams
*Attorney, Agent, or Firm*—Sughrue, Mion, Zinn, Macpeak and Seas

[57] ABSTRACT

Process for coating a conductive substrate used as the anode in an electrochemical cell, in which a direct electric current is passed from a cathode to the said anode through an electrolytic liquid containing a phenolic monomer in order to form a polymeric film of phenolic resin on the substrate.

The electrolyte includes from 10 to 200 g/l of allylphenol or a mixture of such with other phenols, and from 5 to 200 g/l of an aliphatic amine, in solution in a mixture of water and alcohol. The polymeric film is deposited by using an electric current of a density not greater than 50 mA/cm² of substrate, and the polymeric film so deposited is heated to a temperature of from 100° to 200° C. in order to induce the hardening of the said resin.

13 Claims, No Drawings

PROCESS FOR THE ELECTROLYTIC COATING OF CONDUCTIVE SUBSTRATES WITH PROTECTIVE FILMS OF PHENOLIC RESINS

The present invention relates to a process for the electrolytic coating of conductive substrates with protective films of the polyoxyphenylene-type having high flexibility and adherence.

The possibility of forming adherent, inert films on metallic substrates used as the anode in an electrochemical cell in which a direct flow of electrical energy is passed from a cathode to the said anode through an electrolytic liquid including a phenol is already known in the art.

This method of coating, by means of electrolytic polymerisation, is theoretically very advantageous in that it allows the synthesis of the polymer and its deposition on the substrate to be achieved simultaneously, adherent polyoxyphenylene films being obtained with a high degree of cross-linking and with good properties of heat-resistance and chemical and physical inertness.

The processes known in the art for this purpose are based essentially on the use of particular electrolytic liquids. Thus, for example, it has been proposed in U.S. Pat. No. 2,961,384 to use, as the electrolyte, a nonaqueous system consisting of phenol, either molten or in solution in a solvent, generally including small quantities of alkali-metal hydroxides. However, the technological potential of this process is limited by the toxicity of the electrolyte and by its high resistivity. A further disadvantage is the need to operate at high temperatures. Moreover, the thickness of the film obtained is generally very small ($10^3$ Å).

It has also been proposed in U.K. Pat. No. 1,156,309 to use an aqueous solution of phenol at least partially salified with sodium hydroxide. This process results in the production of coating with poor mechanical and dielectric properties.

Other processes based on the use of non-aqueous electrolytes containing phenols substituted with alkyl or aryl groups or halogens, and possibly certain amines, have not allowed completely satisfactory coatings to be obtained, particularly with regard to the thickness of the film, which is generally very thin, and its mechanical properties.

In our co-pending patent application, Ser. No. 27,700, filed Apr. 6, 1979, now U.S. Pat. No. 4,231,851, it has been proposed to use, as the electrolyte, a composition including phenol as the principal monomer, lesser quantities of a substituted phenol (generally o-chlorophenol), and ethylenediamine or other alkylenediamine, in an aqueous medium containing variable percentages of alcohol. These compositions may be electrolysed with moderate voltages in single-compartment cells. By varying the electrolysis time from several minutes to more than thirty minutes, coatings are obtained with thicknesses of from several μm to several tens of μm having good protective and insulating characteristics.

However, a systematic examination of the physical characteristics of the coatings thus obtained shows that these are not completely satisfactory for use in those sections of technology which require considerable stress or deformations of the coated article, in that a polyoxyphenolic film with complex cross-linking becomes less elastic as its thickness increases.

A further limitation to the use of phenol/substituted phenol/ethylene diamine compositions is determined by the voltages usable for the film-forming process. It has, in fact, been found that the voltages may not be increased beyond a certain limit without considerable loss of efficiency of the process itself. With cells having cell constants of about 20 cm, the best results are obtained with voltages of 3 to 4 volts. The consequences of this fact are as follows:

the electrolysis currents are of low intensity and hence the electrolysis times required to obtain the thicker films are relatively long, in coating articles with relatively complex structures, such as the insides of tubes or boxes, the modest electrical fields applied may result in non-satisfactory coating-penetration in hidden zones, or at least shielded zones, of the said article.

An object of the present invention is to provide a process which results in the attainment, by an electrolytic method, of thick coatings of the polyoxyphenylene type, having high flexibility and adhesion to any type of metallic anode, or even to any type of conductor. A further object is to provide a process which may be carried out with relatively high applied voltages (up to 20 V in cells having cell constants of about 20 cm), and hence with high current densities (up to 50 mA/cm$^2$), with rapid formation of the polymeric film and considerable penetration into the more shielded zones of the electric field.

According to the present invention, it has been found that the aforesaid objects may be obtained by using an electrolyte containing allylphenol.

The present invention thus relates to a process for coating a conductive substrate used as the anode in an electrochemical cell in which a direct electric current is passed from a cathode to the said anode through an electrolytic liquid containing one or more phenolic monomers, to form a polymeric film of phenolic resin on the substrate, characterised in that an electrolyte is used which includes from 10 to 200 g/l of phenolic monomer consisting of allylphenol or a mixture of this latter with one or more other phenols, and from 5 to 200 g/l of an aliphatic amine, preferably allylamine, in solution in a mixture of water and alcohol in a volume ratio of from 20:1 to 0.05:1, the polymeric film is formed by using an electric current of density not greater than 50 mA/cm$^2$ of substrate, and the polymeric film thus deposited is heated at a temperature of from 100° to 200° C. to induce the hardening of the said resin.

The phenolic monomer preferably consists of allylphenol, even though it is possible (and may be convenient for economic reasons) to use mixtures thereof with other phenols used for the purpose in the known art. Examples of these monomers are phenol and substituted phenols, preferably substituted in the ortho and/or meta positions with respect to the phenolic hydroxyl group, with halogens, alkoxy, alkyl or aryl groups. The partial substitution of the allylphenol generally results in a reduction in the properties of elasticity and lack of fragility of the coating, and hence it is preferable to maintain a percentage of allylphenol in the monomer mixture of at least 25% by weight, and preferably at least 50% by weight, so as to maintain high values of these properties and obtain optimal adhesion of the coating to the substrate. The most suitable percentage of allylphenol in the mixture depends on the properties desired for the coating and on the concentration of the monomers in solution.

The concentration of the phenolic monomers in the electrolyte is generally greater than 20 g/l, and preferably from 25 to 75 g/l. The allylphenol is preferably chosen from the ortho and meta isomers. The best results are obtained with ortho-allylphenol. It is also possible to use allylphenols substituted in the phenolic ring, preferably in the ortho and/or meta positions with respect to the hydroxyl group. The substituents must be such as not to block the ortho and the para positions with respect to the hydroxyl group simultaneously. Examples of substituents are alkyl groups, preferably having from 1 to 5 carbon atoms, $NH_2$, Cl or other groups which can favour the adsorption onto the anode surface and increase the reactivity.

The electrolyte also includes an aliphatic amine, preferably in quantities of from 10 to 75 g/l. The best results are obtained with allylamine, but coatings with satisfactory characteristics may also be obtained by replacing in part or fully the allylamine by other aliphatic amines. It is preferable in this case to use amines having from 1 to 4 atoms of carbon, preferably primary amines, and particularly amines which contain functional groups such as —OH, —Cl, —$C_6H_5$, or other functional groups which result in an improvement in the adsorption onto the anode surface on the aliphatic chain. The amine salifies the phenol and guarantees a regular increase in the thickness of the films. The amine may be present in the polymeric film in quantities of up to 5% molar.

The electrolytic solution includes an alcohol which essentially has the function of improving the dissolution of the phenolic monomer. The alcohol is generally chosen from lower alcohols having from 1 to 4 carbon atoms. The best results are generally obtained with methanol. The volume ratio between the water and the alcohol in the electrolyte is preferably from 5:1 to 0.2:1.

The electrolyte may also contain flow agents such as Cellosolve, which improve the surface properties and appearance of the coating, and alkali metal or alkaline earth metal hydroxides, such as sodium hydroxide, which improve the conductivity of the electrolytic solution. The flow agent may be present in quantities of from 0.5 to 5% by volume and the hydroxide in percentages by weight varying from 0.5 to 2% by weight. The temperature of the electrolysis bath is generally maintained at values of from 5° to 50° C. The electrolysis may conveniently be carried out at 20° to 25° C. and at atmospheric pressure. The hardening of the polymeric film is preferably carried out at about 150° C. The heating time is generally from 5 to 60 minutes.

The present invention is based essentially on the following considerations:

(a) the anodic polymerisation of systems consisting essentially of phenol inevitably results in very branched chains being formed, in that even the ortho positions of the phenoxy radicals (or macro radicals) may act as coupling sites by the reaction:

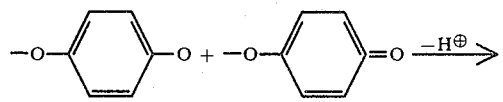

-continued

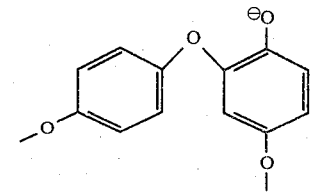

(b) it is known that amines add easily to quinones in aqueous-alcoholic media and, since the oxidative polymerisation of phenols involves several equilibria and rearrangements with intermediate structures of the quinone-type, it is reasonable to suppose that the considerable percentages of ethylene diamine present in the coatings prepared according to the aforesaid co-pending patent application Ser. No. 27,700 are due to reaction of this type. Now a diamine, such as ethylene diamine, by coupling with two different chains can certainly contribute to the cross-linking of the polymeric film.

(c) the absorption onto an anodic surface of an organic molecule (and, in all probability, the subsequent adhesion of a possible polymer derived from it) may be increased by the presence of unsaturated groups, in that the $\pi$ orbitals may easily interact with the anodic substrates especially when these consist of transition metal lattices.

Consequently, points (a) and (b) have resulted in the interpretation of the poor flexibility and elasticity of polyoxyphenylene-type coatings obtained from compositions based on phenol and ethylene diamine as due to excessive cross-linking and branching of the polymeric structures.

On the other hand, point (c) has shown a possible direction of research for improving compositions in order to give the polyoxyphenylene films greater adhesion to the anodic substrate and, as will be seen, greater elasticity.

The use of an electrolyte including allylphenol allows greater adhesion of the polymer to the anodic substrate to be obtained because of the unsaturated allyl groups. With ortho-allylphenol, moreover, the probability of the branching of the chains discussed at point (a) will, statistically, be reduced by one half.

On the other hand, the aliphatic amine is not susceptible to cross-linking at two different polymeric chain sites (during the electrolytic process), as discussed at point (b) for ethylene diamine. Moreover, the strong interaction between the allyl group and the substrate makes allylamine perfectly suitable for polymerisation with phenolic compounds to form adherent films.

In other words, the electrolysis of compositions based essentially on allylphenol and preferably allylamine allow polymeric films to be formed on the conductive article, used as the anode, having a polyoxyphenylene-type structure which is essentially linear but, however, strongly adherent to the anodic substrate. The linearity of the chains and the reduced cross-linking resulting at the end of the electrolytic formation process, are indicated by the fact that polymeric films dried at ambient temperatures, or at least below 100° C., may be removed from the substrate and dissolved by means of any organic solvent, such as acetone. The films may, however, be easily cross-linked and rendered completely insoluble while maintaining good characteristics of non-fragility and adhesion to the substrate, by a curing process, typically carried out for several tens of minutes (typically 30 minutes) at 150° C. It is reasonable to suppose that the polymeric molecules become cross-linked through the coupling of a certain number of allyl groups. Since in this case the bonding between different polyoxyphenylene chains occurs with bridges of several atoms not belonging to the aromatic system, presumably the deformability of the bond angles in these bridges ensures sufficient elasticity of the cross-linked coating.

With regard to the electrolytic process for forming the films, compositions based essentially on allylphenol and preferably allylamine in aqueous-alcoholic solvents, when electrolysed with constant voltages in a cell which is not divided by diaphragms between an anode formed by the article to be coated and a cathode which is substantially inert with respect to the anodic process, give rise to coatings which are considerably hydrophobic and electrically insulating, as is seen, in the course of the process, by the constant decrease in the current which falls to a few percent of its initial value. With the cells used in the following examples, having cell constants of about 20 cm, the compositions may be electrolysed to form homogeneous, adherent films with a minimum voltage of about 3 volts. An increase in the applied voltage results in higher electrolysis currents and a more rapid reaction rate for the formation of the polymeric film without bringing out either degradation of the film itself, rapid passivation, or drops in current yield, even at voltages equal to, or greater than, 20 volts. The current yield in fact remains at values approximately equal to the theoretical value of 2 Faradays per mole of phenol deposited. These facts may be explained both by the lower molecular complexity of the polymeric film (compared to those obtainable from phenol/ethylene diamine), which allows passage of the electric charge without perforation of the film at high applied electric fields, and by the greater affinity of the composition for the anode substrate which results in a strong adsorption even at very positive potentials.

The composition may, with advantage, be electrolysed in cells consisting simply of cylindrical vessels in which a spiral of platinum or other metal which is stable in an alkaline aqueous-alcoholic medium, or a grid of the same metal fixed to the wall of the cylinder, constitutes the cathode while the article to be coated immersed in the centre of the vessel, constitutes the anode. The applied voltage is such as to provide an initial current density not greater than 50 mA/cm$^2$. When the current density has reduced considerably (between 10 and 0.05 mA/cm$^2$) the article is taken out of the cell and placed in an oven (typically for 30 minutes at 150° C.) where the polymeric film undergoes cross-linking to form structures insoluble in acid, basic and organic solvents. Furthermore, it is inert towards the great majority of chemical or physical agents, and its outer appearance has the character of an enamel with different shades of colour from yellowish green to reddish brown, depending on its thickness and the type of substrate.

By means of the process of the invention, it is possible to obtain coatings having typical thicknesses of the order of 10 to 20 microns.

In order better to illustrate the invention, several typical experiments carried out by using the process of the invention will now be given by way of example.

EXAMPLE 1

Into an electrolytic cell was introduced a solution having the following composition: 6.2 g of o-allylphenol, 4.6 g of allylamine, 2 ml of Cellosolve, 60 ml of methanol and 60 ml of water. A series of sheets of soft steel having a useful surface of about 27 cm$^2$ were used as the article to be coated. The electrolysis conditions and the respective results are given in the Table 1. In the Table, a coating yield of 1 mg/cm$^2$ of substrate corresponds to a thickness of about 10 microns. A consideration of these results explains many of the advantageous kinetic characteristics of the process of formation of the coatings according to the invention. As regards the physical properties of resilience and adhesion, the coated sheets, once baked at 150° C. for 30 minutes, could be bent to any angle, or broken up, without detachment of the polymeric film or cracking of its surface. Checking tests, and subsequent detachment with an adhesive strip, show extremely good adhesion of the films to the metal, which is confirmed by tests carried out with a conic mandrel, while drawing tests show the possibility of penetrations and deformations greater than 8 mm without any sign of detachment.

EXAMPLE 2

This was carried out as in Example 1, with the use as the anode of a hollow iron tube having a diameter of 1 cm and a length of 6 cm, placed vertically, perpendicular to the electric field. After an initial voltage of 5 volts had been applied for 15 minutes, the outer surface was completely and homogeneously coated, while the electrolysis current had changed from an initial value of 10 mA/cm$^2$ to 2 mA/cm$^2$. At this point the voltage was raised to 20 volts for 15 minutes and a polymeric film was formed which coated the internal surface up to 4/5 of its length starting from the bottom. After drying as in Example 1, the thickness of the outer film was about 15 microns and the average thickness of the inner film was about 10 microns.

EXAMPLE 3

A solution having the following composition was introduced into the electrolytic cell: 5 g of o-allylphenol, 2.3 g of allylamine, 2 ml of Cellosolve, 60 ml methanol, 0.5 g KOH, water up to a volume of 100 ml. A spiral of copper wire ($\phi = 2$ mm) of a length equal to 78 cm was used as the anode. After electrolysis with a voltage of 10 volts for 20 minutes, the initial current of 10 mA/cm$^2$ had fallen to 0.5 mA/cm$^2$, with the formation on the anode of a homogeneous polymeric coating having a thickness of 15 microns. After drying in an oven for 20 minutes at 150° C., the copper wire could be unrolled and braided without detachment of the protective film. When using this wire as a conductor, the loss of current through the coated surface (once the wire had been immersed in electrolytic solution) was found to be negligible.

EXAMPLE 4

A solution having a composition similar to that given for Example 1 was electrolysed, except that 3 g of o-allylphenol were replaced by 3 g of phenol. 30 sheets of soft steel, each having a useful surface of 25 cm$^2$, were used in succession as the anode. By varying the applied voltage between 4 and 12 volts and the electrolysis times between 20 minutes and 5 minutes, coatings were obtained having a thickness of about 15 microns (about 1.5 mg/cm² of substrate) with a current yield of between 0.5 and 0.4 mg/Coulomb. The properties of adhesion of the polymeric films, dried as in Example 1, to the substrate were similar to those of Example 1, and repeated bending of the coated samples did not result in any noteworthy fracture of the coatings.

TABLE 1

| Applied Potential (V) | Time (min) | Charge (Coulombs) | I-initial (mA/cm²) | I-final (mA/cm²) | Current yield (Mg/Coulomb) | Coating Yield (mg/cm²) |
|---|---|---|---|---|---|---|
| 3.0 | 50 | 81 | 2.78 | 0.59 | 0.577 | 1.73 |
| 4.0 | 20 | 76 | 7.04 | 1.48 | 0.539 | 1.52 |
| 5.0 | 15 | 78 | 8.52 | 1.89 | 0.564 | 1.63 |
| 6.0 | 15 | 88 | 11.48 | 2.22 | 0.534 | 1.74 |
| 7.0 | 10 | 75 | 14.44 | 2.89 | 0.547 | 1.52 |
| 8.0 | 10 | 82 | 16.67 | 3.15 | 0.524 | 1.59 |
| 10.0 | 8 | 86 | 23.33 | 5.00 | 0.477 | 1.52 |
| 12.0 | 5 | 82 | 24.82 | 7.04 | 0.419 | 1.27 |
| 15.0 | 3 | 74 | 31.48 | 10.55 | 0.400 | 1.17 |

We claim:

1. A process for coating a conductive substrate used as the anode in an electrochemical cell in which a direct electric current is passed from a cathode to the said anode through an electrolytic liquid containing one or more phenolic monomers to form a polymeric film of phenolic resin on the substrate, which comprises using an electrolyte which includes from 10 to 200 g/l of phenolic monomer consisting of allylphenol or a mixture thereof with one or more other phenols, and from 5 to 200 g/l of an aliphatic amine, in solution in a mixture of water and alcohol in a volume ratio of from 20:1 to 0.05:1, forming the polymeric film by using an electric current of density not greater than 50 mA/cm² of substrate, and heating the polymeric film thus deposited at a temperature of from 100° to 200° C. to induce hardening of the said resin.

2. The process of claim 1, wherein said phenolic monomer is allylphenol.

3. The process of claim 1, wherein said allylphenol is ortho- or meta-allylphenol.

4. The process of claim 1, wherein said allylphenol is ortho-allylphenol.

5. The process of claim 1, wherein said mixture of phenols comprises at least 25% by weight of allylphenol.

6. The process of claim 1, wherein said amine is allylamine.

7. The process of claim 1, wherein said allylphenol carries one or more substituents in the ring in positions such as not to block simultaneously the ortho and the para positions with respect to the hydroxyl group.

8. The process of claim 1, wherein said alcohol is methanol.

9. The process of claim 1, wherein the electrolyte further comprises from 0.5 to 5% by volume of flow agent to improve the surface properties and appearance of the coating.

10. The process of claim 1, wherein the electrolyte further comprises from 0.5 to 2% by weight of alkali metal or alkaline earth metal hydroxide.

11. The process of claim 1, wherein the voltage of said electric current is maintained at a constant value during the formation of the polymeric film.

12. The process of claim 1, wherein the voltage of said electric current is from 3 to 20 volts.

13. The process of claim 1, wherein said heating is carried out for a period of from 5 to 60 minutes.

* * * * *